(12) United States Patent
McCleland et al.

(10) Patent No.: US 9,917,942 B2
(45) Date of Patent: Mar. 13, 2018

(54) UNIQUELY IDENTIFYING A PORTABLE ELECTRONIC DEVICE

(71) Applicants: Barry John McCleland, Southlake, TX (US); Eugene Christiaan van Beljon, Grapevine, TX (US)

(72) Inventors: Barry John McCleland, Southlake, TX (US); Eugene Christiaan van Beljon, Grapevine, TX (US)

(*) Notice: Subject to any disclaimer, the term of this patent is extended or adjusted under 35 U.S.C. 154(b) by 0 days.

(21) Appl. No.: 15/192,348

(22) Filed: Jun. 24, 2016

(65) Prior Publication Data
US 2016/0381200 A1    Dec. 29, 2016

(30) Foreign Application Priority Data
Jun. 24, 2015 (ZA) .................................. 2015/04550

(51) Int. Cl.
*H04M 1/72* (2006.01)
*G06K 9/00* (2006.01)
*H04W 52/02* (2009.01)
*H04M 1/725* (2006.01)

(52) U.S. Cl.
CPC .... *H04M 1/72527* (2013.01); *G06K 9/00429* (2013.01); *H04W 52/027* (2013.01); *H04W 52/0254* (2013.01); *Y02B 60/50* (2013.01)

(58) Field of Classification Search
CPC ..... H04W 4/023; H04W 12/06; H04W 8/183; H04W 88/02; H04L 67/22; H04M 1/72569; H04M 1/72572; H04M 2250/14; G06Q 50/01; G06Q 30/0252; H04B 1/3816

USPC ......................................................... 455/558
See application file for complete search history.

(56) References Cited

U.S. PATENT DOCUMENTS

| | | | |
|---|---|---|---|
| 6,854,651 B2 | 2/2005 | Smith et al. | |
| 7,240,836 B2* | 7/2007 | Vrotsos | G06Q 20/341 235/380 |
| 7,436,958 B2* | 10/2008 | Ji | H04L 29/12009 380/200 |
| 8,608,053 B2 | 12/2013 | Meier et al. | |
| 9,147,191 B2 | 9/2015 | Cohen et al. | |
| 2012/0091202 A1* | 4/2012 | Cohen | G06F 21/33 235/382 |
| 2012/0095853 A1 | 4/2012 | von Bose et al. | |
| 2016/0323107 A1* | 11/2016 | Bhogal | H04L 9/3247 |

* cited by examiner

*Primary Examiner* — Sharad Rampuria
(74) *Attorney, Agent, or Firm* — Norton Rose Fulbright US LLP

(57) ABSTRACT

A system and method for uniquely identifying a portable electronic device using a user device are provided. In a method conducted at the portable electronic device, user input prompting display of an optical device identifier is received. A device identifier uniquely associated with the electronic device is retrieved from a read-only digital memory of the electronic device, the device identifier having been programmed into the electronic device at the time of manufacture. An optical device identifier being an optical machine-readable representation of the unique device identifier is generated and output on a display screen of the electronic device for subsequent acquisition by a user device. Outputting the optical device identifier on the display screen of the device for acquisition by a user device may obviate the need for the device identifier to be otherwise displayed on the electronic device, for example, by way of a printed or embossed label.

15 Claims, 5 Drawing Sheets

UNIQUELY IDENTIFYING A PORTABLE ELECTRONIC DEVICE

CROSS-REFERENCE TO RELATED APPLICATIONS

This application claims priority from South African patent application number 2015/04550 filed on 24 Jun. 2015, which is incorporated by reference herein.

FIELD OF THE INVENTION

This invention relates to a system and a method for uniquely identifying a portable electronic device using a user device. In particular, the invention relates to a system and a method for uniquely identifying a portable electronic device by way of an optical device identifier.

BACKGROUND OF THE INVENTION

A barcode is an optical machine-readable representation of data. There are various types of barcodes which use different shapes and structures to represent data. One such example is by varying widths and spacings of parallel lines (referred to as a linear or one-dimensional barcode). Other examples include various shapes and configurations of rectangles, dots, hexagons and other geometric patterns to represent data in two dimensions.

Barcodes have found use in displaying optical machine-readable identifiers of products including devices, equipment tagging, tickets, coupons, consumables and the like. Such barcodes may be printed onto a label (e.g. paper, metal or plastic) and adhered to the product or packaging thereof. In other cases, the barcode may be printed or embossed on the product or its packaging. A barcode could represent the type or model number of a product, or otherwise be a unique identifier that changes for every device Most portable electronic devices, for example, have a unique identifier which is represented as a barcode and printed onto a label which is adhered to the relevant device or the packaging thereof. The identifier may serve to uniquely identify the device and may for example be a serial number or model number of the device.

Adhering a unique barcode to, or printing a unique barcode on each electronic device may, however, be an expensive and time consuming procedure. For example, to install machinery configured to fix or otherwise label an electronic device with a consecutively numbered barcode may involve significant expense. This particularly may be the case where the number of devices is very large.

Furthermore, to correctly label the electronic device such that the identifier stored in a digital memory of the electronic device matches the identifier in the barcode with which the electronic device is labelled may be challenging and may extend the time and cost of manufacturing the electronic device.

There is accordingly a need for a technology which address these and/or other problems, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with a first aspect of the invention, there is provided a method of uniquely identifying a portable electronic device using a user device, the method conducted at the portable electronic device comprising:

receiving user input prompting display of an optical device identifier;

retrieving, from a read-only digital memory of the portable electronic device, a device identifier uniquely associated with the portable electronic device, wherein the device identifier is programmed into the portable electronic device at the time of manufacture;

generating an optical device identifier, the optical device identifier being an optical machine-readable representation of the device identifier; and, outputting the optical device identifier on a display screen of the portable electronic device for subsequent acquisition by a user device.

Outputting the optical device identifier on the display screen of the device for acquisition by a user device may obviate the need for the device identifier to be otherwise displayed on the portable electronic device, for example, by way of a printed or embossed label.

In one embodiment, the user input is in the form of a user activating a button of the portable electronic device. The button may be a dedicated button, and may be a physical button or may be provided by a touch-sensitive display screen. In an alternative embodiment, the user input is in the form of a user navigating to a particular submenu of a menu displayed on the display screen of the portable electronic device.

A yet further feature provides for the portable electronic device to be woken from a sleep mode responsive to the step of receiving user input.

Further features provide for the portable electronic device to include a first radio transceiver, for the method to include a step of transmitting the device identifier via the first radio transceiver; and for transmitting the device identifier via the first radio transceiver to be upon the pressing of a physical button which causes the optical device identifier to be output on the display screen.

Even further features provide for the portable electronic device to include a second radio transceiver, and for the method to include a step of transmitting the device identifier via one or both of the first radio transceiver and the second radio transceiver.

A further feature provides for the step of generating an optical device identifier to include generating a barcode into which the device identifier is encoded.

Yet further features provide for the device identifier to be a unique 64-bit device identifier.

In accordance with a second aspect of the invention, there is provided a system for uniquely identifying a portable electronic device using a user device, the portable electronic device comprising:

a user interface for receiving user input prompting display of an optical device identifier;

a retrieving component for retrieving, from a read-only digital memory of the portable electronic device, a device identifier uniquely associated with the portable electronic device, wherein the device identifier is programmed into the portable electronic device at the time of manufacture;

a generating component for generating an optical device identifier, the optical device identifier being an optical machine-readable representation of the device identifier; and, an output component for outputting the optical device identifier on a display screen of the portable electronic device for subsequent acquisition by the user device.

In one embodiment the user interface includes a button, for the user input to be in the form of a user activating the button; for the button to be a dedicated button, and for the button to be a physical button or to be provided by a touch-sensitive display screen. In another embodiment the user input is in the form of a user navigating to a particular submenu of a menu displayed on the display screen of the portable electronic device.

A further feature provides for the portable electronic device to be woken from a sleep mode responsive to the user interface receiving user input.

A still further feature provides for the portable electronic device to include a first radio transceiver and a transmitting component for transmitting the device identifier via the first radio transceiver.

Yet further features provide for the portable electronic device to include a second radio transceiver, and for the transmitting component to transmit the device identifier via one or both of the first radio transceiver and the second radio transceiver.

A further feature provides for the generating component to generate a barcode into which the device identifier is encoded.

A still further feature provides for the device identifier to be a unique 64-bit device identifier.

The invention extends to a computer program product for uniquely identifying a portable electronic device using a user device, the computer program product comprising a computer-readable medium having stored computer-readable program code for performing the steps of:

receiving user input prompting display of an optical device identifier;

retrieving, from a read-only digital memory of the portable electronic device, a device identifier uniquely associated with the portable electronic device, wherein the device identifier is programmed into the portable electronic device at the time of manufacture;

generating an optical device identifier, the optical device identifier being an optical machine-readable representation of the device identifier; and, outputting the optical device identifier on a display screen of the portable electronic device for subsequent acquisition by a user device.

Further features provide for the computer-readable medium to be a non-transitory computer-readable medium and for the computer-readable program code to be executable by a processing circuit.

BRIEF DESCRIPTION OF THE DRAWINGS

The invention will now be described, by way of example only, with reference to the accompanying representations in which.

DETAILED DESCRIPTION WITH REFERENCE TO THE DRAWINGS

Figure 1:
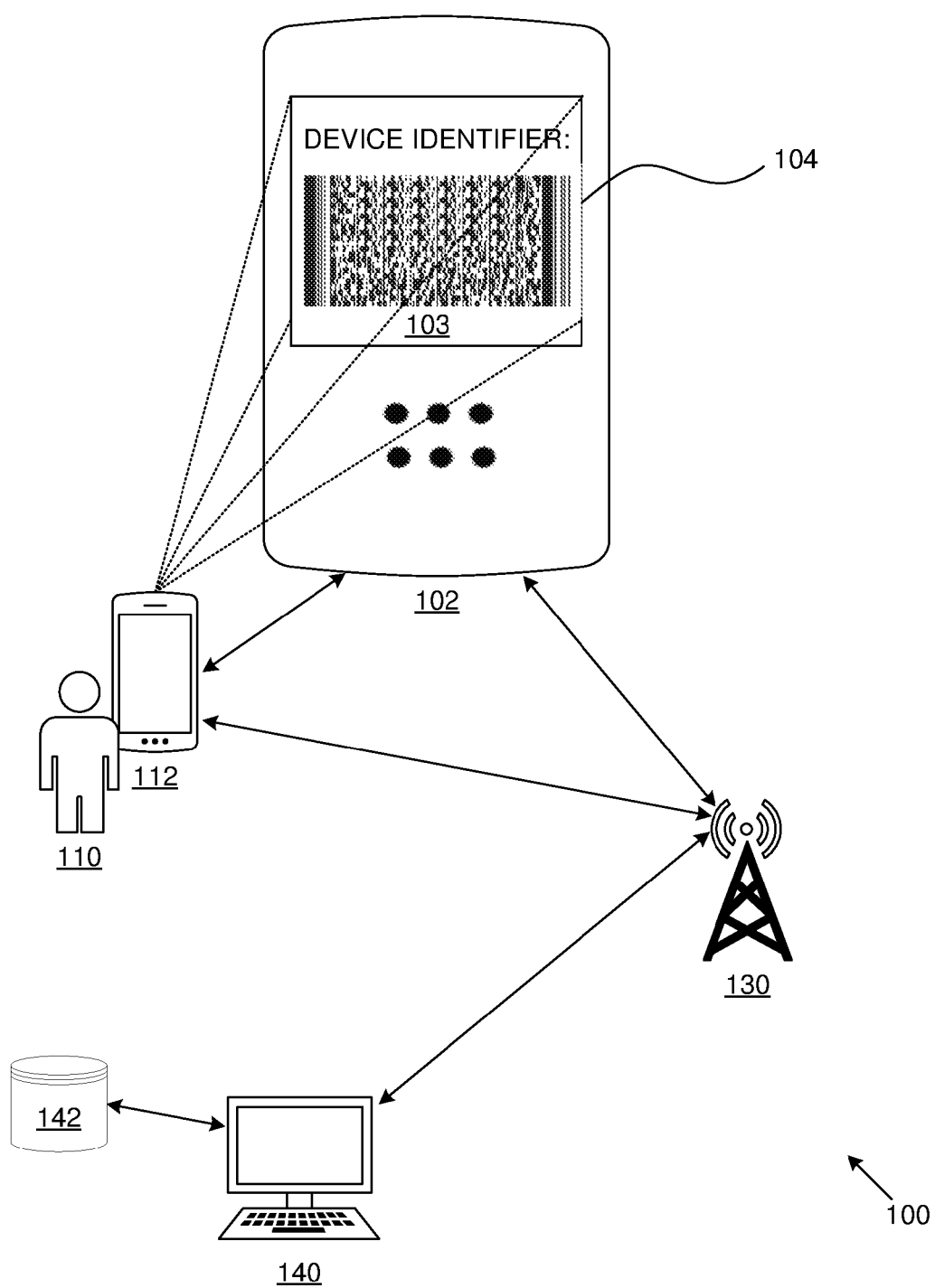
FIG. 1 is a schematic diagram which illustrates a system for uniquely identifying a portable electronic device.

FIG. 1 is a schematic diagram which illustrates one example of a system (100) for uniquely identifying a portable electronic device. The system (100) includes a portable electronic device (102), a user device (112), a communication network (130) and a server (140).

The portable electronic device (102) may be any appropriate portable electronic device or portable communication device, examples of which include a mobile phone, a smart phone, a tablet computer, a personal digital assistant. In this exemplary system (100), the portable electronic device (102) is a hand-held, portable monitoring device designed to be associated with an object in transit. Exemplary objects in transit include crates, containers, pallets, goods, products and the like. The objects in transit may need to be associated with a device identifier of the portable electronic device. For example, the user may be required to incorporate the device identifier of the portable electronic device (or monitoring device) onto the manifest, packing slip or invoice of the object in transit. Further, the association may be required for updating the server (140) to record the association between the object in transit and the portable electronic device, for example, for the purposes of tracking, logging and/or auditing the object as it is transported from one place to the next.

The electronic device (102) may include a number of sensors to monitor the environment to which the object with which it is associated is exposed. The sensors may be microelectromechanical systems (MEMS) sensors such as temperature, pressure, acceleration, magnetometer sensors and the like. The electronic device (102) further includes a display screen (103) via which sensor data and/or information may be graphically displayed to a user (110). The electronic device (102) also includes a number of buttons with which the user (110) can input instructions and information into the electronic device (102) and/or with which the user (110) can control the electronic device (102). The electronic device (102) also includes a digital memory and, in this exemplary embodiment, a first radio transceiver and a second radio transceiver via which the electronic device (102) may transmit and receive information and/or data.

The electronic device (102) is uniquely associated with a device identifier which, in this embodiment, is a 64-bit identifier and may, for example be a numeric or alphanumeric identifier. In some cases the identifier may function as a manufacturer serial number and/or a model number of the electronic device. The identifier may be a manufacturer-provided identifier and may enable the electronic device (102) to be uniquely identified from other electronic devices. The device identifier is stored in the digital memory of the electronic device and may have been stored in the digital memory at the time of manufacturing the electronic device (102). "Manufacture" and derivatives thereof as used herein includes any making, assembly and/or production of the device.

The electronic device (102) is configured to output the device identifier. This may include retrieving the device identifier from the digital memory, generating an optical device identifier, being an optical machine-readable representation of the device identifier, and outputting the optical device identifier (104) on the display screen (103) of the portable electronic device (102) for subsequent acquisition by the user device (112) or other appropriate device. The electronic device (102) may also be configured to transmit the device identifier via one or both of the first radio transceiver or the second radio transceiver. Transmitting the device identifier via the first radio transceiver may transmit the device identifier to the server (140) via the communications network (130) while transmitting the device identifier via the second radio transceiver may transmit the device identifier to the user device (112).

The user device (112) may be any appropriate device capable of receiving the device identifier from the electronic device (102). An exemplary user device (112) includes a smart phone having a camera capability to enable the user device to capture an image of the optical device identifier (104) being displayed on the electronic device (102). Another example of a user device includes a computing device having an optical device identifier reader (e.g. a barcode scanner) to enable the user device (112) to capture and decode the optical device identifier (104) being displayed on the electronic device (102). In one embodiment, the user device (112) may have a second radio transceiver via which the user device (112) is operable to transmit and receive data and/or information. As such, the user device (112) may be configured to receive the device identifier being transmitted from the portable electronic device (102) via the second radio transceiver of the electronic device (102) as well as optically via the optical device identifier (104).

Responsive to receiving the device identifier, the user device (112) may be configured to display the device identifier on a display screen of the user device. In some cases, the user device (112) may be configured to transmit the device identifier to the server (140) via the communication network (130) together with a request for details of the object with which the portable electronic device is associated. In another case, the user (110) may input details of the object with which the electronic device (102) is associated and transmit the details together with the device identifier to the sever (140) for storage thereat.

The server (140) may be any appropriate server computer and may include a server computer cluster, a distributed server computer or a cloud-based server computer. The server computer (140) has access to a database (142) in which data and/or information may be organised and stored and from which data and/or information may be retrieved. The database (142) may have device identifiers of a number of electronic devices stored therein. The server (140) may be configured to store details of the object with which the electronic device is associated in the database (142) in association with the device identifier of the electronic device (102). The server (140) may also be configured to transmit details stored in association with the device identifier to the user device (112).

Figure 2:
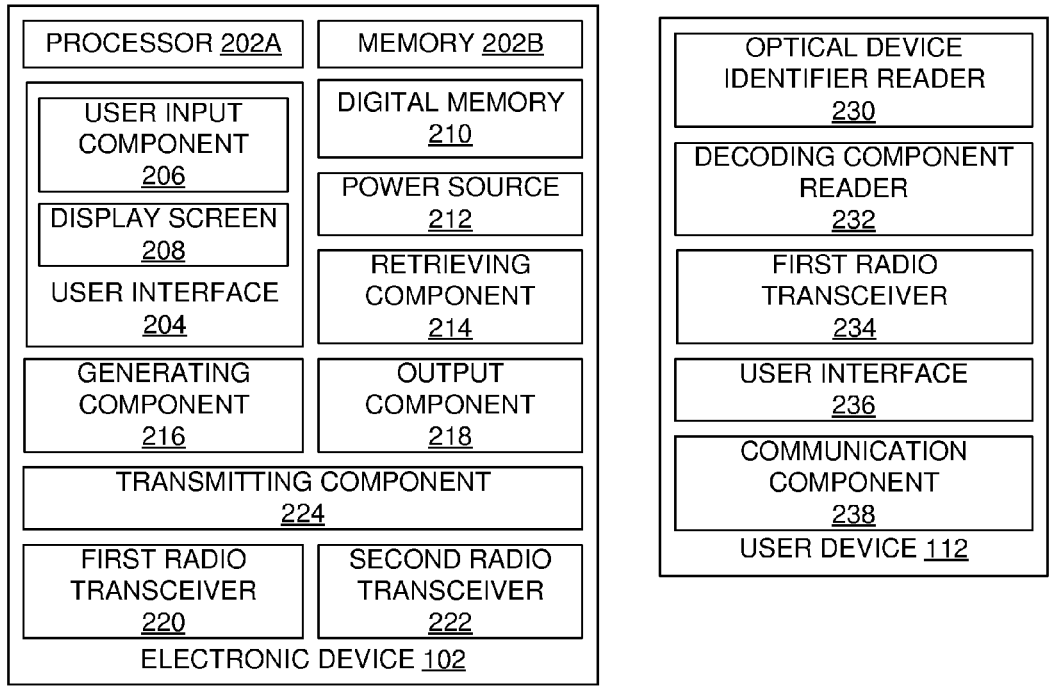
FIG. 2 is a block diagram which illustrates a system for uniquely identifying a portable electronic device.
Figure 2:
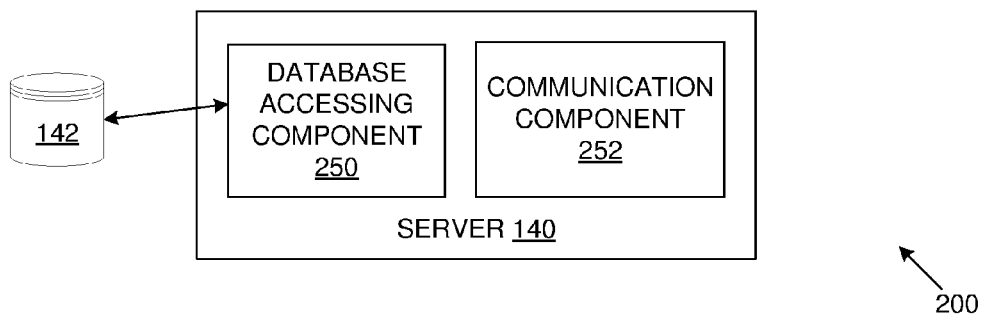

An exemplary electronic device, user device and server are illustrated in greater detail in FIG. 2, which is a block diagram showing a system (200) for uniquely identifying a portable electronic device. The system (200) includes a portable electronic device (102), a user device (112) and a server (140).

The portable electronic device (102) which may be a hand-held portable electronic device, may include a processor (202A) for executing the functions of components described below, which be provided by hardware or by software units executing on the portable electronic device (102). The software units may be stored in a memory component (202B) and instructions may be provided to the processor (202A) to carry out the functionality of the described components. Some or all of the components may be provided by a software application downloadable onto and executable on the portable electronic device (102).

The portable electronic device (102) includes a user interface (204) which includes a user input component (206) and a display screen (208). The user input component (206) may include one or more buttons with which a user can input information into the electronic device (102) and with which the user can control the electronic device (102). In one exemplary embodiment, the user input component (206) includes six push-buttons. In other implementations, the user input component may be provided by a touch-sensitive screen which may provide button-like inputs, a microphone, one or more switches or the like. The user input component (206) may provide a dedicated button for prompting display of an optical device identifier. Providing a dedicated button may lower the cognitive burden experienced by a user in causing an optical device identifier to be output and may accordingly enable the optical device identifier to be output swiftly and with a minimum delay.

The electronic device (102) includes a digital memory (210) in which a device identifier uniquely associated with the electronic device is stored. The digital memory (210) may be a non-volatile, read-only memory. The digital memory (210) may be arranged to prevent the device identifier from being changed or tampered with and may be a one-time electrically programmable read-only memory or a write-once read-many memory. The device identifier may be stored in the digital memory (210) as read-only data which cannot be changed or overwritten. The electronic device (102) further includes a power source (212) which may, for example, be a battery.

Furthermore, the electronic device includes a retrieving component (214) for retrieving the device identifier from the digital memory (210). The electronic device (102) also includes a generating component (216) for generating an optical device identifier. The generating component may generate an optical device identifier being an optical machine-readable representation of the device identifier, such as a barcode.

Figure 3:
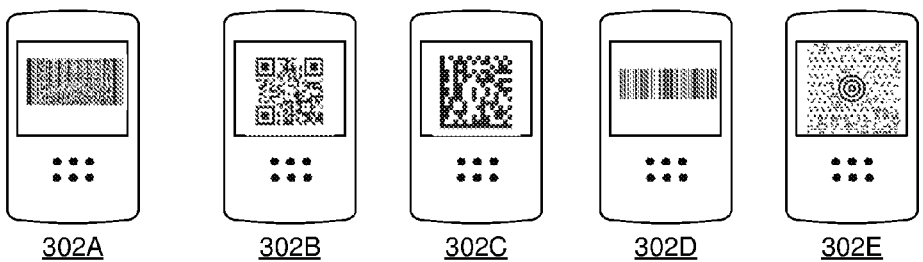
FIG. 3 is a schematic diagram which illustrates various exemplary optical device identifiers.

Some exemplary barcodes which the generating component (216) may be configured to generate are shown in FIG. 3, which illustrates: an electronic device (302A) displaying a PDF 417 or compact PDF 417 barcode; an electronic device (302B) displaying a quick response (QR) code; an electronic device (302C) displaying a Data Matrix barcode; an electronic device (302D) displaying a linear barcode; and, an electronic device (302E) displaying a MaxiCode. These are just exemplary barcodes which the generating component (216) may be configured to generate, and it should be appreciated that any appropriate optical machine-readable representation of the device identifier may be generated. Generating the optical device identifier may include calculating check sums of the unique device identifier number for verification.

Returning again to FIG. 2, the electronic device (102) also includes an output component (218) for outputting the optical device identifier on the display screen (208) of the electronic device (102).

The electronic device (102) also includes a first radio transceiver (220) and a second radio transceiver (222). The first radio transceiver (220) may be a radio transceiver configured for wireless mesh network data communication. The first radio transceiver may implement an Institute of Electrical and Electronics Engineers (IEEE) 802.15.4 communication standard, and may operate with a carrier frequency within the 2.4 GHz Industrial Scientific and Medical (ISM) band. The first radio transceiver (220) may be configured to dynamically join or establish a peer-to-peer wireless mesh network with other electronic devices within range or with one or more wireless network controllers or managers. By joining or establishing a wireless mesh network, the electronic device (102) may be able to communicate with a wireless network controller or manager which, in turn, may be configured to communicate with the server (140).

The second radio transceiver (222) may be a short-range, short wavelength (e.g. Bluetooth™) radio transceiver by way of which data and/or information may be transmitted and received using an IEEE 802.15.1 (e.g. Bluetooth™) wireless technology standard. In one embodiment, the second radio transceiver (222) may be operable to implement the Bluetooth™ v.4.0 standard, or Bluetooth™ Low Energy (BLE) to enable low energy data communication.

The electronic device (102) may further include a transmitting component (224) for transmitting the device identifier via one or both of the first radio transceiver (220) and the second radio transceiver (222). The transmitting component (224) may transmit the device identifier substantially simultaneously to the output component (218) outputting the optical device identifier on the display screen (208).

The user device (112) may include a processor and memory for executing the functions of components described below, which may be provided by hardware or by software units executing on the user device (112). The user device (112) includes an optical device identifier reader (230) which may, for example, be a camera or a barcode reader and which is configured to capture the optical device identifier being displayed on the electronic device (102). The user device (112) may also include a decoding component (232) for decoding the optical device identifier to obtain the device identifier therefrom.

The user device (112) further includes a second radio transceiver (234) which is operable to receive a device identifier being transmitted from the electronic device (102). The second radio transceiver (234) may be a short-range, short wavelength (e.g. Bluetooth™) radio transceiver in that it can transmit and receive data and/or information using the IEEE 802.15.1 (e.g. Bluetooth™) wireless technology standard and, in some embodiments, the Bluetooth™ v.4.0 wireless technology standard.

The user device (112) also has a user interface (236) which may include a user input receiving component (e.g. a keyboard) and a display screen on which information and data may be displayed. The user interface (236) may enable a user to view the decoded device identifier. The user interface may further enable a user to view details relating to the object with which the electronic device (102) is associated or alternatively to input details relating to the object with which the electronic device (102) is associated.

The user device (112) may also include a communication component (238) for transmitting and receiving information and/or data, such as the device identifier and details relating to the object with which the electronic device is associated, to and from the sever (140) via the communication network.

The server (140) has a database accessing component (250) for retrieving data from and writing data to the database (142). The server (140) may also include a communication component (252) for transmitting and receiving information and/or data to and from the user device (112) via the communication network (130). The server (140) may, for example, receive the device identifier from the user device (112) or from the portable electronic device (102). In some cases, the device identifier may be received together with a request for details relating to the object with which the electronic device (102) is associated, responsive to which the server (140) may retrieve details relating to the object with which the electronic device is associated, using the database accessing component (250) and transmit the details to the user device (112). In another case, the device identifier may be received together with details of the object with which the electronic device is associated, responsive to which the database accessing component (250) is operable to store the received details in the database (142) in association with the device identifier.

Figure 4:
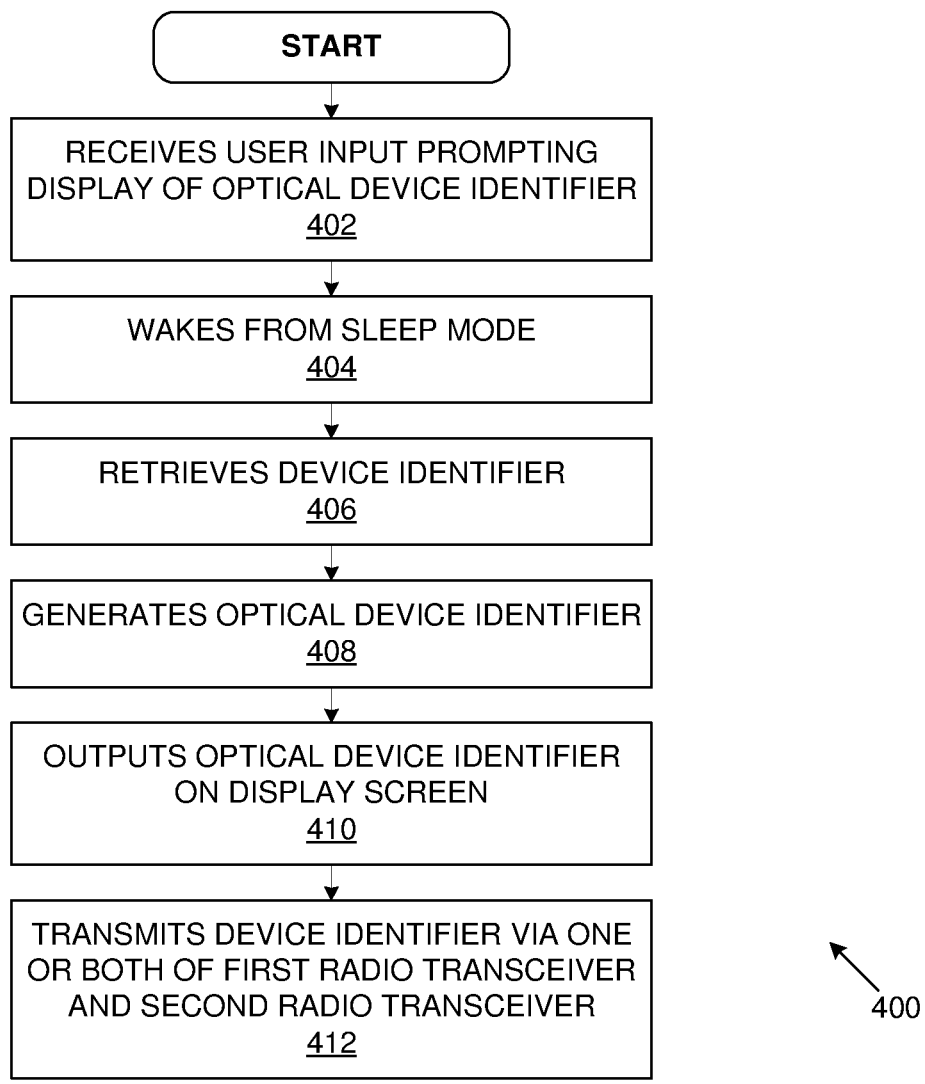
FIG. 4 is a flow diagram which illustrates a method for uniquely identifying a portable electronic device.

FIG. 4 is a flow diagram which illustrates a method (400) for uniquely identifying a portable electronic device. The method is conducted at an electronic device such as the portable electronic device (102) described above. The method (400) is described with reference to an exemplary scenario in which the electronic device is a portable monitoring device associated with an object, such as a crate of products being shipped from a source to a destination. The electronic device may for example be located within the crate which may, for example, arrive at a shipping depot upon which an authorised user may wish to check that all of the products are still in the crate, update a record associated with the crate, etc.

In doing so, the user may input a user input into the electronic device using the user input component. The user input may prompt display of the optical device identifier. For example, the user may press a button on the electronic device, responsive to which, at a first stage (402), the electronic device receives user input prompting display of an optical device identifier. The button may be a dedicated button which is dedicated to causing the electronic device to generate and display the optical device identifier. The button may be provided via a touch-sensitive display screen or may be a physical push button. The button, whether physical or via a touch-sensitive display screen, may be easily locatable by and identifiable to the user to reduce the cognitive burden experienced by the user and in turn reduce the time it takes for the optical device identifier to be caused to be generated and displayed. For example, in the case of a button provided by a touch-sensitive display screen, the button may be accessible without having to navigate through menus.

Responsive to receiving the user input, the electronic device is woken from a sleep mode at a following stage (404). In this exemplary embodiment, the electronic device is configured to spend much of its time in a sleep, or low power, mode so as to minimise usage of electrical power and to thereby extend battery-life of the electronic device. Waking the electronic device from a sleep mode may cause the processor of the electronic device to execute various predefined routines, such as checking sensors, initializing radio transceivers, activating the display screen, etc.

Once the electronic device has been woken from its sleep mode, first and second radio transceivers of the electronic device may perform initialization routines to determine whether the electronic device is within range of any appropriate communication networks. If the electronic device is within range of a communication network, the electronic device may perform a handshake with the communication network to enable the electronic device to transmit and receive data via the communication network. Exemplary communication networks include a Bluetooth™ communication link, a wireless mesh network, a Wireless-Fidelity (Wi-Fi) network, cellular network or the like. In some cases, performing a handshake includes reviving information (e.g.

time, date, network identifier and location) from a network controller or gateway. This information may be included in data packets transmitted from the portable electronic device.

At a next stage (406), the electronic device retrieves a device identifier uniquely associated with the portable electronic device from the digital memory of the portable electronic device. The device identifier may be a unique 64-bit device identifier which is programmed into the portable electronic device at the time of manufacture and which is read-only (i.e. not capable of being changed after it has been stored).

The electronic device then, at a following stage (408), generates an optical device identifier. The optical device identifier is an optical machine-readable representation of the device identifier. In one exemplary scenario, the optical device identifier is a barcode which represents the unique device identifier. The barcode may take on any form of barcode, such as a linear barcode or a two dimensional bar code (e.g. a PDF 417 or compact PDF 417 barcode). Generating the optical device identifier may include calculating check sums of the device identifier for verification. In some embodiments, the optical device identifier may be stored after being generated for the first time for subsequent retrieval thereafter.

At a following stage (410), the electronic device outputs the optical device identifier on a display screen thereof. It should be appreciated that the time from the user beginning to input his or her input to the time the optical device identifier is output on the display may be short, possibly a matter of seconds or even less than a second. By making the button a dedicated button which is easy to identify and locate or otherwise requiring minimal user input and by configuring the portable electronic device to quickly generate and display the barcode, even if the device is being woken from a sleep mode, the need for conventional, printed barcodes which uniquely identify electronic devices, may be obviated. This may be advantageous in reducing the cost and complexity of manufacturing the electronic device.

Once the optical device identifier has been displayed on the display screen of the electronic device, the user device may be able to acquire or capture the optical device identifier using, for example, an optical device identifier reader such as a camera or barcode scanner, associated therewith.

At a further stage (412), the electronic device may transmit the device identifier via one or both of a first radio transceiver and a second radio transceiver. This stage (412) may be conducted at any point after the stage (406) of retrieving the device identifier from the digital memory and may be conducted substantially in parallel to (e.g. simultaneously with) the steps of generating and outputting the optical device identifier. Thus, the device identifier may be transmitted while the optical device identifier is being generated or while it is being displayed on the display screen of the electronic device. In some cases, the electronic device transmits one or more of date, time and location data together with the device identifier. The stage (412) of the electronic device transmitting the device identifier via one or both of a first radio transceiver and a second radio transceiver may be advantageous in cases where a barcode scanner is not available to capture the optical device identifier being displayed on the electronic device.

Once the device identifier has been obtained by the user device (via the optical device identifier or via the radio transceiver), the user device may display the device identifier to the user on a display screen of the user device. The user device may also display a list of products contained in the crate with which the electronic device is associated so that the user may check the crate to ensure that all of the products are present. The list of products may be obtained by the user device transmitting the device identifier to a server computer together with a request for details of the object with which the electronic device is associated. In other cases, the user device may associate a consignment, a product, etc. with the device identifier. In some cases, the device identifier may be transmitted to a server whereat it can be stored in a database which enables the user's shipment (e.g. using a tracking number) of a package or freight to be automatically associated with the unique device identifier of the portable electronic monitoring device.

The method (400) described above includes a number of stages. It should be appreciated that the order in which the steps are conducted may vary from one implementation to the next. For example, in one embodiment, the optical device identifier may be generated once at initialization of the electronic device, after the electronic device is first powered up, and thereafter stored in the digital memory of the electronic device. Each time the electronic device is woken from its sleep mode the electronic device may retrieve the stored optical device identifier from the digital memory and display the retrieved optical device identifier on the display screen thereof.

Figure 5A:
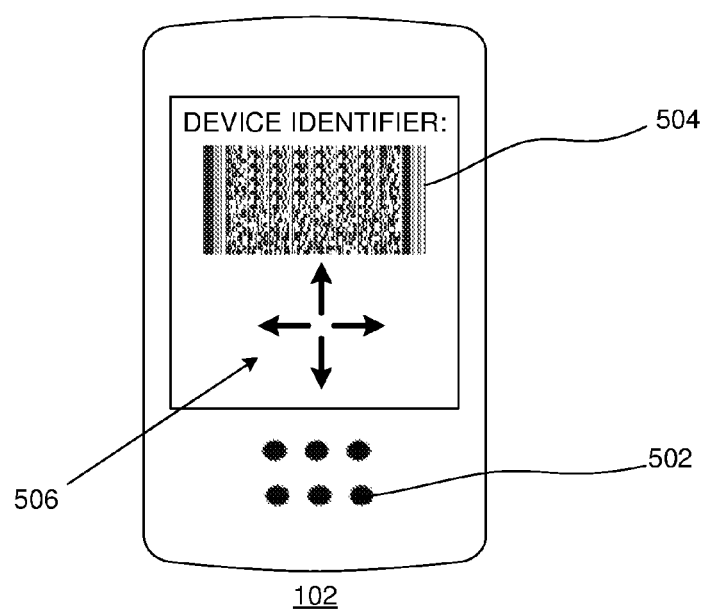
FIG. 5A is a schematic diagram which illustrates one exemplary procedure by way of which user input prompting display of an optical device identifier may be received.
Figure 5B:
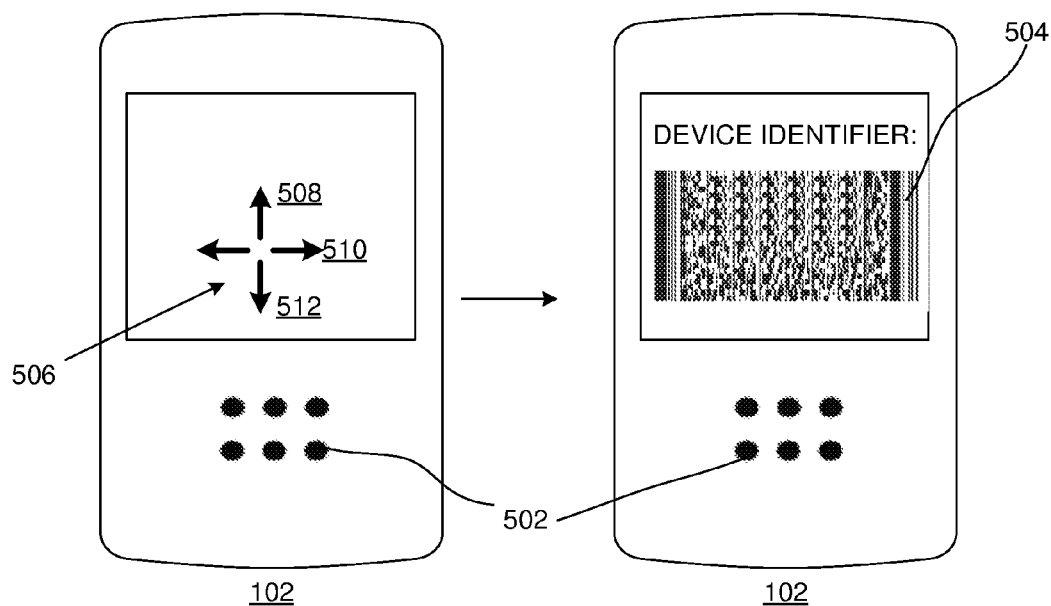
FIG. 5B is a schematic diagram which illustrates another exemplary procedure by way of which user input prompting display of an optical device identifier may be received.

Additionally, the stage (402) of receiving user input may occur in a number of ways. FIGS. 5A and 5B illustrate two exemplary procedures by way of which user input prompting display of an optical device identifier may be received.

In a first procedure, illustrated in FIG. 5A, a user may press any one of a number of buttons (502) on the electronic device (102). Pressing of a button (502) may cause a signal to be sent to a processor of the electronic device (102), in turn causing the electronic device to wake from a sleep mode. Responsive to waking from the sleep mode, the electronic device (102) displays the optical device identifier (504) on the display screen of the electronic device together with a menu (506). The menu (506) may display various items or submenus to which a user of the electronic device can navigate using the buttons (502), for example.

FIG. 5B shows another procedure by way of which user input prompting display of an optical device identifier may be received. In this procedure, pressing of a button (502) may cause a signal to be sent to a processor of the electronic device (102), in turn causing the electronic device to wake from a sleep mode. Responsive to waking from the sleep mode, the electronic device (102) displays a menu (506) on the display screen of the electronic device. The menu (506) may display various items or submenus to which a user of the electronic device can navigate. Navigating to a particular, predefined submenu or item (508) (e.g. by pressing an 'up' button in this example) may cause the electronic device (102) to display of the optical device identifier (504) on the display screen of the electronic device.

FIGS. 5A and 5B show only two exemplary procedures by way of which user input prompting display of an optical device identifier may be received and it should be appreciated that user input taking on various forms may be required in order to prompt display of the optical device identifier. As mentioned above, in other embodiments, a dedicated button (e.g. a "barcode" button) may be provided either by way of a physical button or a button provided on a touch-sensitive display screen which is easily identifiable and possibly persistent (e.g. persistently visible during menu navigation).

The embodiments described herein accordingly enable an optical device identifier (e.g. a barcode of a unique device identifier) to be output on a portable electronic device with a minimum cognitive burden (i.e. without having to navigate through menus and sub-menus, without having to select data to convert, etc.) required from the user.

Embodiments described herein provide a portable electronic device to which is assigned a unique device identifier which is capable of uniquely identifying the particular electronic device from other electronic devices of the same type, for example. The device identifier may be assigned at the time of manufacture, or shortly thereafter. The electronic device is operable to generate an optical device identifier (e.g. a barcode) which is an optical machine-readable representation of the device identifier and to display the optical device identifier on a display screen of the electronic device upon being prompted to do so.

Generating and displaying an optical device identifier, for example in a barcode format, on a display screen of an electronic device eliminates the need to print a barcode label and adhere it to the device. This may reduce manufacturing costs and complexities arising where an electronic device already having a unique device identifier stored in a digital memory thereof must have a barcode, representing the same device identifier, adhered thereon.

Furthermore, by simultaneously transmitting the device identifier via one or more radio transceivers overcomes problems which may arise where, for example, the display screen of the electronic device is damaged. Thus, even where a display screen of an electronic device as described herein is damaged, the unique device identifier associated with the electronic device may still be obtained.

The disclosure provides a system and method for acquiring a unique device identifier of a portable electronic device, either by scanning a barcode generated and displayed on a display screen of the device, or by the transmission of the device identifier to a server. The device identifier may then be associated with the portable electronic device with a package, shipment, etc.

Figure 6:
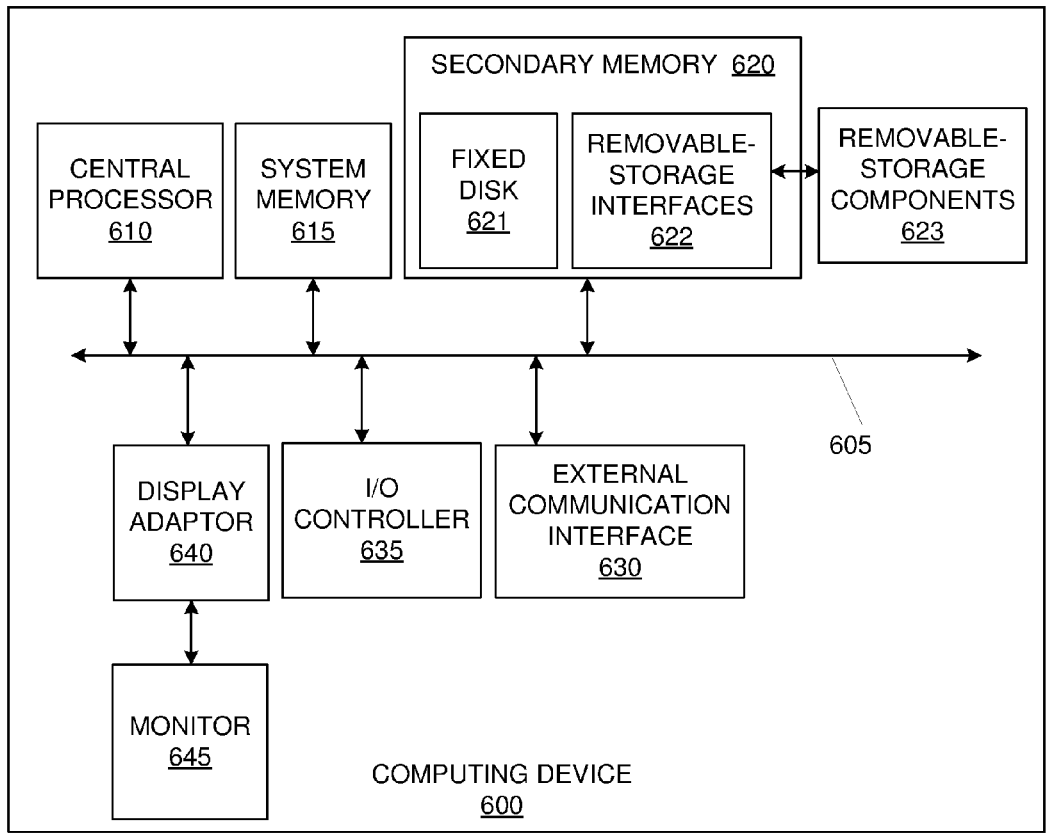
FIG. 6 illustrates an example of a computing device in which various aspects of the disclosure may be implemented; and, FIG. 7 shows a block diagram of a communication device that may be used in embodiments of the disclosure.

FIG. 6 illustrates an example of a computing device (600) in which various aspects of the disclosure may be implemented, such as the user device (112) and/or server (140). The computing device (600) may be suitable for storing and executing computer program code. The various participants and elements in the previously described system diagrams may use any suitable number of subsystems or components of the computing device (600) to facilitate the functions described herein.

The computing device (600) may include subsystems or components interconnected via a communication infrastructure (605) (for example, a communications bus, a cross-over bar device, or a network). The computing device (600) may include at least one central processor (610) and at least one memory component in the form of computer-readable media.

The memory components may include system memory (615), which may include read only memory (ROM) and random access memory (RAM). A basic input/output system (BIOS) may be stored in ROM. System software may be stored in the system memory (615) including operating system software.

The memory components may also include secondary memory (620). The secondary memory (620) may include a fixed disk (621), such as a hard disk drive, and, optionally, one or more removable-storage interfaces (622) for removable-storage components (623).

The removable-storage interfaces (622) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (622) may also be in the form of ports or sockets for interfacing with other forms of removable-storage components (623) such as a flash memory drive, external hard drive, or removable memory chip, etc.

The computing device (600) may include an external communications interface (630) for operation of the computing device (600) in a networked environment enabling transfer of data between multiple computing devices (600). Data transferred via the external communications interface (630) may be in the form of signals, which may be electronic, electromagnetic, optical, radio, or other types of signal.

The external communications interface (630) may enable communication of data between the computing device (600) and other computing devices including servers and external storage facilities. Web services may be accessible by the computing device (600) via the communications interface (630).

The external communications interface (630) may also enable other forms of communication to and from the computing device (600) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (610).

A computer program product may be provided by a non-transient computer-readable medium, or may be provided via a signal or other transient means via the communications interface (630).

Interconnection via the communication infrastructure (605) allows a central processor (610) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (600) either directly or via an I/O controller (635). These components may be connected to the computing device (600) by any number of means known in the art, such as a serial port.

One or more monitors (645) may be coupled via a display or video adapter (640) to the computing device (600).

Figure 7:
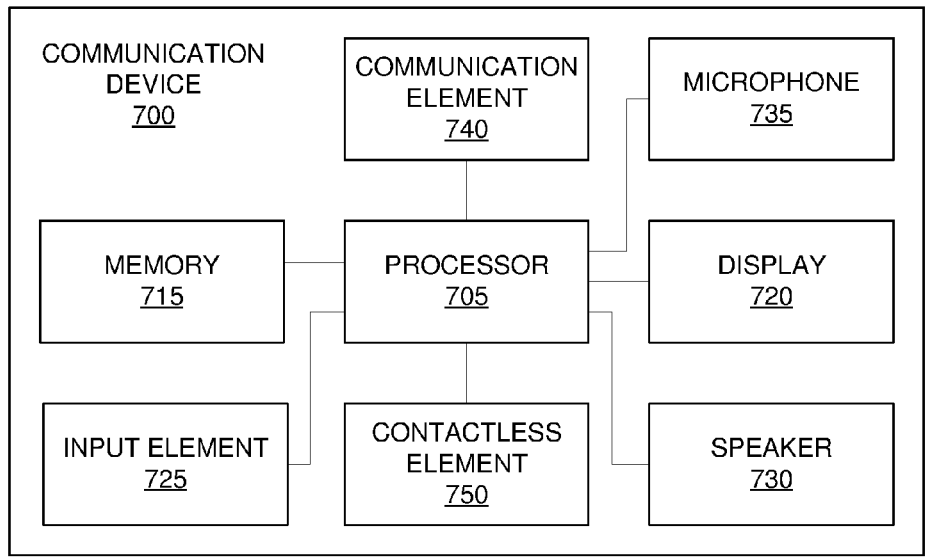

FIG. 7 shows a block diagram of a communication device (700) that may be used in embodiments of the disclosure. The communication device (700) may be a cell phone, a feature phone, a smart phone, a satellite phone, or a computing device having a phone capability.

The communication device (700) may include a processor (705) (e.g., a microprocessor) for processing the functions of the communication device (700) and a display (720) to allow a user to see the phone numbers and other information and messages. The communication device (700) may further include an input element (725) to allow a user to input information into the device (e.g., input buttons, touch screen, etc.), a speaker (730) to allow the user to hear voice communication, music, etc., and a microphone (735) to allow the user to transmit his or her voice through the communication device (700).

The processor (710) of the communication device (700) may connect to a memory (715).

The memory (715) may be in the form of a computer-readable medium that stores data and, optionally, computer-executable instructions.

The communication device (700) may also include a communication element (740) for connection to communication channels (e.g., a cellular telephone network, data transmission network, Wi-Fi network, satellite-phone network, Internet network, Satellite Internet Network, etc.). The communication element (740) may include an associated wireless transfer element, such as an antenna.

The communication element (740) may include a subscriber identity module (SIM) in the form of an integrated circuit that stores an international mobile subscriber identity and the related key used to identify and authenticate a subscriber using the communication device (700). One or more subscriber identity modules may be removable from the communication device (700) or embedded in the communication device (700).

The communication device (700) may further include a contactless element (750), which is typically implemented in the form of a semiconductor chip (or other data storage element) with an associated wireless transfer element, such as an antenna. The contactless element (750) may be associated with (e.g., embedded within) the communication device (700) and data or control instructions transmitted via a cellular network may be applied to the contactless element (750) by means of a contactless element interface (not shown). The contactless element interface may function to permit the exchange of data and/or control instructions between mobile device circuitry (and hence the cellular network) and the contactless element (750).

The contactless element (750) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (700) and an interrogation device. Thus, the communication device (700) may be capable of communicating and transferring data and/or control instructions via both a cellular network and near field communications capability.

The data stored in the memory (715) may include: operation data relating to the operation of the communication device (700), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (700) to selected receivers.

The communication device (700) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method of uniquely identifying a portable electronic device using a user device, the method conducted at the portable electronic device comprising:
   receiving user input prompting display of an optical device identifier;
   retrieving, from a read-only digital memory of the portable electronic device,
   a device identifier uniquely associated with the portable electronic device,
   wherein the device identifier is programmed into the read-only digital memory of the portable electronic device at the time of manufacture;
   generating a barcode into which the optical device identifier is encoded, the barcode being an optical machine-readable representation of the device identifier; and outputting the barcode on a display screen of the portable electronic device for optical capturing by a user device, wherein the device identifier is a unique 64-bit device identifier.

2. The method as claimed in claim 1, wherein the user input is in the form of a user activating a button of the portable electronic device.

3. The method as claimed in claim 2 wherein the button is a dedicated button, and wherein the button is a physical button or is provided by a touch-sensitive display screen.

4. The method as claimed in claim 1, wherein the user input is in the form of a user navigating to a particular submenu of a menu displayed on the display screen of the portable electronic device.

5. The method as claimed in claim 1, wherein the portable electronic device is woken from a sleep mode responsive to the step of receiving user input.

6. The method as claimed in claim 1, wherein the portable electronic device includes a first radio transceiver, and wherein the method includes a step of transmitting the device identifier via the first radio transceiver.

7. The method as claimed in claim 6, wherein the portable electronic device includes a second radio transceiver, and wherein the method includes a step of transmitting the device identifier via one or both of the first radio transceiver and the second radio transceiver.

8. A system for uniquely identifying a portable electronic device using a user device, the portable electronic device comprising:
 a user interface for receiving user input prompting display of an optical device identifier;
  a retrieving component for retrieving, from a read-only digital memory of the portable electronic device, a device identifier uniquely associated with the portable electronic device,
  wherein the device identifier is programmed into the read-only digital memory of the portable electronic device at the time of manufacture;
  a generating component for generating a barcode into which the optical device identifier is encoded, the barcode being an optical machine-readable representation of the device identifier; and
  an output component for outputting the barcode on a display screen of the portable electronic device for optical capturing by a user device,
  wherein the device identifier is a unique 64-bit device identifier.

9. The system as claimed in claim 8, wherein the user interface includes a button and wherein the user input is in the form of a user activating the button.

10. The system as claimed in claim 9 wherein the button is a dedicated button, and wherein the button is a physical button or is provided by a touch-sensitive display screen.

11. The system as claimed in claim 8, wherein the user input is in the form of a user navigating to a particular submenu of a menu displayed on the display screen of the portable electronic device.

12. The system as claimed in claim 8, wherein the portable electronic device is woken from a sleep mode responsive to the user interface receiving user input.

13. The system as claimed in claim 8, wherein the portable electronic device includes a first radio transceiver and a transmitting component for transmitting the device identifier via the first radio transceiver.

14. The system as claimed in claim 13, wherein the portable electronic device includes a second radio transceiver, and wherein the transmitting component transmits the device identifier via one or both of the first radio transceiver and the second radio transceiver.

15. A computer program product for uniquely identifying a portable electronic device using a user device, the computer program product comprising a non-transitory computer-readable medium having stored computer-readable program code executable by a processing circuit for performing the steps of:
 receiving user input prompting display of an optical device identifier;
 retrieving, from a read-only digital memory of the portable electronic device,
 a device identifier uniquely associated with the portable electronic device, wherein the device identifier is programmed into the read-only digital memory of the portable electronic device at the time of manufacture;
 generating a barcode into which the optical device identifier is encoded,
 the barcode being an optical machine-readable representation of the device identifier; and
 outputting the barcode on a display screen of the portable electronic device for optical capturing by a user device, wherein the device identifier is a unique 64-bit device identifier.

* * * * *